United States Patent [19]

Chu et al.

[11] Patent Number: 5,017,430
[45] Date of Patent: May 21, 1991

[54] HEAT SEALABLE PACKAGING FILM WITH DRAWABLE PRIMER

[75] Inventors: Shaw-Chang Chu, West Winsor, N.J.; Kevin A. Kirk, Macedon, N.Y.

[73] Assignee: Mobil Oil Corporation, Fairfax, Va.

[21] Appl. No.: 276,071

[22] Filed: Nov. 25, 1988

[51] Int. Cl.$^5$ ............................................. B32B 7/12
[52] U.S. Cl. .................................. 428/353; 428/349; 428/516; 428/520; 428/219; 428/518
[58] Field of Search ............... 428/349, 516, 520, 353, 428/518

[56] References Cited

U.S. PATENT DOCUMENTS 4,564,559 1/1986 Wagner et al. .................... 428/349

Primary Examiner—Edith Buffalow
Attorney, Agent, or Firm—Alexander J. McKillop; Charles J. Speciale

[57] ABSTRACT

An oriented heat sealable multilayer film structure having a polyolefin film substrate, a thermoplastic primer coating on the substrate and a heat sealable acrylic or polyvinylidene coating applied to at least one primer coated surface. The primer has a glass transition of from about 0° to about 50° C.

15 Claims, No Drawings

HEAT SEALABLE PACKAGING FILM WITH DRAWABLE PRIMER

This invention relates to multilayer oriented, thermoplastic films, and more particularly to thermoplastic film, such as polypropylene, coated with an aqueous primer composition having superior clarity which improves the adhesion of a heat sealable topcoat to the base as well as enhances the heat seal strength of the coated film.

Acrylic and vinylidene chloride copolymers (PVDC) have been used as heat sealable coatings for oriented thermoplastic films such as polypropylene film. When thermoplastic film substrates are coated with these heat sealable coatings, it is particularly important to insure that the adhesion of the coating layer to the film substrate is adequate. In many packaging operations it is necessary for the coated film to be heat sealed to itself or to other films to form tightly closed packaging. If the coating adhesion to the base film is inadequate, the packages may prematurely open when subjected to stress.

In general, acrylic and PVDC coatings do not adhere well to polypropylene film surfaces, even when the latter have been subjected to well known pre-treatment operations such as treatment by corona discharge, flame or oxidizing chemicals. Accordingly, it has been found necessary to apply a thin intermediate primer layer to the surface of the polypropylene base film before applying heat sealable topcoats.

Typical primers used for the acrylic and PVDC coatings disclosed in the prior art include an aqueous polyethyleneimine solution for the acrylic and a water dispersed epoxy resin for the PVDC coatings. Polyethyleneimine primer is commercially available and is generally applied as a 0.1%–0.6% by weight polyethyleneimine solution in water or organic solvent. U.S. Pat. No. 4,214,039 discloses a water dispersed epoxy resin primer coating composition. While both of these primers serve the desired adhesion-promoting function, they have shown many drawbacks when compared with the present invention. The epoxy primer is not only expensive and complex to manufacture, but also has a very limited shelf-life once it is made. In addition, the epoxy primer fails to stretch when coated on the base film between the MD and TD orientation process because of its thermosetting characteristics. The polyethyleneimine primer, on the other hand, has become difficult to obtain because its precursor, ethyleneimine, is a known carcinogen. In addition, polyethyleneimine has a tendency to discolor and affects the film appearance.

U.K. Patent No. 1,134,876 discloses a primer produced by condensing a monoaldehyde with an interpolymer of acrylamide or methacrylamide and at least one other unsaturated monomer. U.K. Patent No. 1,174,328 discloses a material resulting from condensing aminoaldehyde with acrylamide or methacrylamide and subsequently interpolymerizing the condensation product with at least one other unsaturated monomer in the presence of a $C_1$–$C_6$ alkanol. A primer coating resin of this type comprises a copolymer containing up to 90% by weight of styrene, up to 80% by weight of an alkyl acrylate, up to 15% by weight of methacrylic acid and 5% to 25% by weight of acrylamide which has been condensed with a solution of formaldehyde in n-butanol containing from 0.2 to 3 equivalents of formaldehyde for each amide group in the copolymer. Another primer resin of this type is a 50% solids solution of a copolymer resin containing 38.5 parts of styrene, 44 parts of ethyl acrylate, 2.5 parts of methacrylic acid and 15 parts of acrylamide which has been condensed with 5.2 parts of formaldehyde in n-butanol.

Both U.K. Patent Nos. 1,134,876 and 1,174,328 disclose thermosetting primers and require the presence of acrylamide to cross-link within the thermosetting primer. A thermosetting primer, however, is limited in its application to oriented film because after it is applied it requires a curing process which renders it insoluble and incapable of stretch. Therefore, it cannot be applied until after film orientation.

A primer material which does not require curing and which can be applied before orientation, between the MD and TD orientations or after orientation is highly desirable.

Accordingly, it is an object of the present invention to provide a primer coating with great flexibility in time of application. It is a further object of the invention to provide a primer with superior clarity and which improves the adhesion of heat sealable topcoats to a film surface and enhances the heat seal strength of coated films.

It is a further object of the invention to provide an oriented multi-layer heat sealable film structure with superior packaging properties.

SUMMARY OF THE INVENTION

In accordance with the present invention, an oriented multi-layer heat sealable film structure is provided which includes:

(a) a polyolefin film substrate layer;

(b) a primer coating on at least one surface of the substrate layer, the primer having a glass transition temperature (Tg) of from about 0° to about 50° C.; and (c) a heat sealable acrylic or PVDC polymeric coating applied to at least one primer coated surface.

The substrate layer is preferably polypropylene and a coextruded layer of random copolymer of ethylene and propylene may be applied on at least one surface of the film substrate before the primer coat is applied.

Such films demonstrate excellent properties including superior adhesion of the heat sealable topcoats to the film substrate as well as superior heat seal strength.

For a better understanding of the present invention, together with other and further objects, reference is made to the following description, and its scope will be pointed out in the appended claims.

DETAILED DESCRIPTION OF THE INVENTION

The polyolefins contemplated as the substrate or core material of the multilayer film structure include polyethylene, polypropylene, polybutene and copolymers and blends thereof. Particularly preferred is an isotactic polypropylene containing at least 80% by weight of isotactic polypropylene. The core material is broadly described as a highly crystalline or highly stereoregular polypropylene in oriented film form. The preferred polypropylenes of the core layer are well known in the art and are formed by polymerizing polypropylene in the presence of stereospecific catalyst systems. These polypropylenes can have a melt flow rate at 446° F. ranging from about 1 to about 25, perferably 2 to 8g/10 minutes. The crystalline melting point of these materials is about 321°–326° F. The average molecular weight ranges from about 25,000 to about 100,000. The density ranges from about 0.90-0.91.

An optional second layer may be coextruded on at least one surface of the core layer. This layer may consist of a ethylene homopolymer, copolymer, terpolymer or blends thereof.

The homopolymer contemplated therein is formed by polymerizing the respective monomer. This can be accomplished by bulk or solution.

The copolymer contemplated herein can be selected from those copolymers typically employed in the manufacture of multi-layered films. For instance, an ethylene propylene random copolymer which is formed by the simultaneous polymerization of the respective monomers can be used to form the optional second layer. Effective formation of a random copolymer of ethylene and propylene is accomplished when the ethylene is present simultaneously with the propylene in the amount sufficient to result in from about 0.5 to about 10% by weight of ethylene in the resulting copolymer. This system is characterized by random placement of the respective monomer units along the polymer chain. This is in contrast to a block copolymer of ethylene and propylene formed by sequential polymerization of the respective monomers. The feeding of the monomers in forming a block copolymer is controlled so that the monomer employed in one stage of the sequential polymerization is not added until the monomer employed in the preceding stage has been at least substantially consumed thereby insuring that the concentration of the monomer remaining from that preceding stage is sufficiently low to prevent formation of an excessive proportion of random copolymer.

The contemplated terpolymers are comparatively low stereoregular polymers. The terpolymers can have a melt flow rate at 446° F. ranging from about 2 to about 10 grams per 10 minutes and preferably from about 4 to about 6 grams per 10 minutes. The crystalline melting point can range from about less that 250° F. to somewhat greater than 271° F. The terpolymers will predominate in propylene, and the ethylene and 1-butene monomers can be present in approximately from 0.3:1-1:1 mole percentage in relation to each other.

The preferred base substrate layer can be homopolypropylene having a melting point range of from about 321° F. to about 336° F. A commercially available material of this description is FINA W828. For the coextruded optional skin layers, preferred terpolymers, such as, ethylene-propylenebutene terpolymers, would have melting points of about 266° F. and 255° F., respectively. The materials are commercially available as Chisso XF 7500 and Chisso XF 7700. These terpolymers contain from about 1 to about 7 wt.% ethylene and from about 1 to about 7 wt.% 1-butene.

In preparing the multi-layer structure of the present invention, the substrate layer and optional second layer are coextruded so that the second layer is from about 2 to about 25% of the total thickness of the two layers. For some purposes, the second layer can be on both surfaces of a core layer of polypropylene in which both layers would amount to from about 4 to about 50% of the total thickness of the three layers. In preparing the coextruded film it has been found advantageous and convenient to recycle certain quantities of scrap extrudate back into the base homopolymer polypropylene or other polyolefin. Thus, the homopolymer polypropylene or other polyolefin can have from about 0 to about 30% of reclaimed material interblended therein.

It has been found that heat seal layers, such as vinylidene chloride copolymer heat seal layers, do not adhere well to polyolefin film surfaces, especially polypropylene film surfaces, even when the latter have been subjected to well known pretreatment operations such as, for example, treatment by corona discharge, flame or oxidizing chemicals. The same has been found to be true in adhering the heat seal layers contemplated herein to the surface of the film substrate or core. However, it has been found that the use of primers intermediate between the core layer and the heat sealable topcoat provides an unexpectedly high level of adherence. In addition, the primer of the present invention has superior clarity and enhances heat seal strength of a topcoat.

The primer composition of the present invention may be characterized by its glass transition temperature (Tg). Polymers will solidify, in the mechanical sense, at a temperature called the glass transition temperature. The Tg may be defined as the temperature at which a polymer changes from a glassy, brittle solid to a highly viscous liquid. Below this temperature, the thermal energy available for chain motion is inadequate to allow a great degree of relative motion between chains. Therefore, temperature changes produce changes in mechanical properties. A certain Tg is characteristic of each polymer. "Hard" monomers are characterized by a high Tg. "Soft" monomers are characterized by a low Tg. A mixture of the two yields a polymer with an intermediate Tg.

In order for a coating resin to meet necessary commercial requirements such as the capability of providing good adhesion to a topcoat at as low a temperature as possible while exhibiting non-blocking characteristics at storage conditions which may be as high as 110° F., it has been found that the Tg of the primer should be in the range of about 0° to about 50° C., preferably between about 10° to about 40° C., and most preferably from about 15° to about 30° C. A Tg which is too low, while it will allow good adhesion of the coating, will tend to be tacky and will cause blocking. A Tg which is too high will result in poor adhesion and in brittleness of the primer.

The primer is a resin consisting essentially of an interpolymer of, for example, acrylic, styrene-acrylic, or vinyl acrylic copolymer.

The interpolymer includes high Tg monomers, low Tg monomers, and a small amount of functional groups such as carboxylic acid or hydroxyl functional groups. The high Tg and low Tg monomers together yield the preferred intermediate Tg compound.

The glass transition temperature (Tg) of a polymer may be calculated according to the following formula:

$$\frac{1}{Tg(°K.) \text{ copolymer}} = \frac{W_1}{Tg(°K.) \text{ monomer}_1} + \frac{W_2}{Tg(°K.) \text{ monomer}_2} + \cdots + \frac{W_n}{Tg(°K.) \text{ monomer}_n}$$

where
$W_1$ = weight fraction of monomer$_1$
$W_2$ = weight fraction of monomer$_2$ ... up to monomer$_n$
$W_n$ = weight fraction of monomer$_n$
$Tg(°K)$monomer = theoretical Tg(°C) +273°

For example, with a primer comprising a copolymer of styrene and ethyl acrylate with:
50 weight percent styrene 50 weight percent ethyl acrylate;
Tg(K) styrene = 373
Tg(K) ethyl acrylate = 251

$$\frac{1}{Tg(°K.) \text{ copolymer}} = \frac{.5}{373°} + \frac{.5}{251°}$$

$Tg(°K.)$ copolymer $= 300°$ K.

$Tg(°C.)$ copolymer $= 300 - 273 = 27°$ C.

In accordance with the present invention, it has been found that the aforediscussed desirable properties of a heat sealable primer resin may be achieved by controlled synthesis of the multipolymers of the present invention.

The novel multipolymers possessing the desired properties of Tg, acid content, and molecular weight may be produced in accordance with the present invention by the proper selection and interpolymerization of the following types of compounds, optionally in the presence of a suitable chain transfer agent such as, for example, mercaptans or halogenated hydrocarbons:
A. A high Tg monomer;
B. A low Tg monomer; and
C. Acid containing monomers.

Examples of high Tg monomers which may be employed include styrene, ethyl methacrylate, methyl methacrylate, acrylonitrile and others.

Examples of low Tg monomers which may be employed include, for example, lower alkyl acrylates such as methyl, ethyl or butyl acrylates.

Examples of acid monomers which may be employed include, for example, acrylic acid, methacrylic acid, maleic acid, crotonic acid and mixtures thereof.

The polymerization reaction may be advantageously carried out by adding the mixed monomers incrementally during the reaction in order to attain a more nearly homogeneous distribution of monomers in the multipolymer molecules.

The relative proportions of monomers which may be employed to produce the novel multipolymer coating compositions of the present invention may vary and include a small amount of one or more polar functional monomers or comonomers. The composition may include from 0 to 10%, and preferably from about 1 to about 5% of an $\alpha$-$\beta$ unsaturated carboxylic acid or mixtures thereof, and from 90% to 100%, and preferably about 95% to 99% by weight of the high and low Tg monomers combined in a proportion of each such as to yield a polymer with a Tg from about 0° to about 50°, said monomers having been interpolymerized utilizing known polymerization techniques such as, for example, emulsion polymerization. Standard polymerization techniques may be employed to produce the primer compositions of the present invention such as, for example, solution, bulk, or emulsion polymerization.

The polar, functional comonomer of this component can also include hydroxyethyl acrylate, hydroxyethyl methacrylate, hydroxypropyl acrylate, hydroxypropyl methacrylate, fumaric acid and itaconic acid.

A requirement of a coating resin which is to be applied by "wet" techniques, as contrasted to hot melt techniques, is that it be soluble or dispersible in volatile solvents to give low viscosity, high solids content solutions or dispersions. For obvious commercial reasons, the solvent should be readily available and inexpensive, with water representing the ultimate goal. Coatings applied as dispersions of polymers in water are commonly called latices. The coating may be applied as an aqueous emulsion or in an organic solvent.

In general, the uncoated substrate films employed in the practice of the present invention are usually from 0.2 to up to 5 mils in thickness and preferably from about 0.5 to 1.5 mils.

The primer of the present invention is a thermoplastic primer which enables it to be applied before or during the orientation process.

As is known in the art, primers may be thermoplastic or thermosetting. Thermosetting primer is cured after application by heat or other means. After curing, the primer becomes insoluble and incapable of stretching so that the film to which it has been applied is no longer capable of being oriented. The present primer has the advantage of flexibility in time of application.

The primer is preferably applied to the film in the form of an aqueous emulsion. The primer may be applied in-line at one of three stages during the film manufacture, before film orientation, between the MD and TD orientation processes or after orientation. Application between MD and TD orientation is preferred.

The primer coating may be applied to the film in any conventional manner. For example, the primer coating may be effected by roller coating, spray coating, slot coating, or immersion coating. Preferably, the coating is applied by gravure roll coating process whereby a single or coextruded layer of a thermoplastic film, such as polypropylene, is extruded and solidified, and thereafter oriented in the MD. The primer coating composition can thereafter be roll-coated on the already MD oriented substrate polypropylene film. The coated film is subsequently oriented in the TD utilizing, for example, a tentering device. Also, the uniaxially drawn film may be subjected to a corona discharge apparatus prior to coating as is known in the art.

The primer coating is preferably applied to the substrate film as an aqueous solution and at a solids concentration within the range of about 1 to about 40% by weight, preferably about 5 to about 20% by weight. The preferred solids level is such as to yield a final dry coating weight of about 0.01 to 1 gram/1000 square inches of film surface. Preferably the range is from about 0.05 to 0.5 g/1000 square inches. The primer coated film can be subsequently passed through a hot air oven to completely remove water or solvent.

The primer coating composition may include in addition to the major constituent, antioxidants, dyes, pigments, lubricants, anti-blocking agents and/or slip agents, i.e. comminuted solids which are insoluble in the coating, e.g. starch, talc, zinc oxide, calcium carbonate, silica, titanium oxide, triferric tetraoxide, silicates, aluminates, and alumina silicates.

A heat sealable layer is present on the primer coated film. The composition of the heat sealable layer is not critical to the practice of the invention. The heat sealable layer may be acrylic or polyvinylidene chloride.

The heat sealable layer can, for example, be derived from any of the terpolymeric compositions disclosed in U.S. Pat. No. 3,753,769, the contents of which are incorporated by references herein. These coating compositions contain as a film forming component a resin consisting essentially of an interpolymer of (a) from about 2 to about 15, and preferably from about 2.5 to about 6, parts by weight of an alpha-beta monoetheylenically unsaturated carboxylic acid selected from the group consisting of acrylic acid, methacrylic acid, and mixtures thereof, and (b) from about 85 to about 98, and preferably from about 94 to about 97.5, parts by weight of neutral monomer esters, said neutral monomer esters preferably comprising (1) methyl acrylate or ethyl acrylate and (2) methyl methacrylate. These interpolymer compositions are further characterized by preferably comprising from about 30 percent to about 55 percent by weight of methyl methacrylate when said alkyl acrylte is methyl acrylate, and from about 52.5 percent to about 69 percent by weight of methylmethacrylate when said alkyl acrylate is ethyl acrylate. Such coating compositions can be applied to the films herein in a variety of ways including in the form of ammoniacal solutions.

Similarly useful are copolymeric coating compositions prepared exclusively from the foregoing neutral monomer esters. These coating compositions are advantageously applied to the film laminates in the form of emulsions.

The heat sealable layer can also be based on any of the known and conventional polyvinylidene chloride (PVDC) compositions heretofore employed as coatings in film manufacturing operations, e.g., any of the PVDC materials described in U.S. Pat. Nos. 4,214,039 and 4,447,494, with prior application of a primer layer to enhance adhesion of the PVDC coating layer to the film surface to which it is applied. Commercially available PVDC latexes having a vinylidene chloride content of at least 50% and preferably from about 75% to about 92% may be employed. The PVDC can also be provided as a copolymer of vinylidene chloride and one or more other ethylenically unsaturated comonomers including alpha, beta ethylenically unsaturated acids such as acrylic and methacrylic acids; alkyl esters containing 1-18 carbon atoms of said acids, such as methylmethacrylate, ethyl acrylate, butyl acrylate, etc. In addition alpha, beta ethylenically unsaturated nitriles such as acrylonitrile and methacrylonitrile and monovinyl aromatic compounds such as styrene and vinyl chloride comonomers can be employed. Specific PVDC latexes contemplated comprise: 82% by weight vinylidene chloride, 14% by weight ethyl acrylate and 4% by weight acrylic acid. Alternatively, a polymer latex comprising about 80% by weight vinylidene chloride, about 17% by weight methyl acrylate and about 3% by weight methacrylic acid can likewise be employed.

The following examples illustrate the essence of this invention.

EXAMPLE 1

An aqueous styrene-acrylic copolymer emulsion with a Tg of 18° C,, Adcote 61JH64A (obtained from Morton Thiokol), was diluted to 10% solids with de-ionized water. This diluted emulsion was placed in a gravure coater which had been installed between the MD orienter and the TD orienter of a pilot scale film orienter. Polypropylene resin (Fina W-472) was extruded through a flat sheet die at 250° C., cast onto a cooling drum and quenched at 30° C. The sheet measured about 35 mils thick, was reheated to 140° C. and stretched 5-fold in the MD, then corona treated for improved surface wettability. The MD oriented film web, when passing through the gravure coater, was coated with the coating emulsion. The coated web was dried in pre-heat zones at 160° C., then stretched 8-fold in the TD at 145° C. and annealed at 160° C. The dry coating weight of this primer coated, biaxially oriented film was approximately 0.1 gram per 1000 square inches of film.

The above primer coated film was placed on a gravure film coater and to the surface of the primer was applied a heat seal layer from an aqueous PVDC emulsion coating, which has a polymer composition of 78% vinylidene chloride, 19% methyl acrylate, and 3% methacrylic acid. The aqueous coating also contained 5 parts of finely divided carnauba wax and 0.5 parts of finely divided talc per 100 parts of the PVDC resin. The coating was dried to yield a coating weight of 1.75 grams per 1000 square inches of film.

EXAMPLE 2

Example 1 was repeated except that the primer coated film was coated with an aqueous acrylic coating, which has a polymer composition of 54% methyl methacrylate, 42% methyl acrylate and 4% methacrylic acid. The acrylic coating also contained 40 parts colloidal silica, 5 parts carnauba wax and 0.5 parts talc per 100 parts of the acrylic resin. The acrylic coating was dried and yielded a coating weight of about 0.6 grams per 1000 square inches of film.

COMPARATIVE EXAMPLES

The following control experiments were conducted under the same conditions as the examples above to show the clear advantage of this invention.

EXAMPLE 1C

A PVDC coated film was prepared in the same manner as Example 1 except that the primer coating emulsion was not applied to the base film.

EXAMPLE 2C

An acrylic coated film was prepared in the same manner as Example 2 except that the primer coating emulsion was omitted.

The above samples were evaluated by ESM heat seal test, which is a heat seal test designed to simulate conditions under which films might be sealed in a typical over-wrapping machine. See U.S. Pat. No. 4,495,027 for a detailed description of this test. The heat seal strength of the above examples are compared in Table 1.

TABLE 1

| Example | ESM Seals 5 psi, 2 Sec. Dwell (g/in.) Temperature, °F. | | | |
| --- | --- | --- | --- | --- |
| | 230 | 250 | 270 | 290 |
| 1 | 380 | 385 | 400 | 400 |
| 1C | 215 | 215 | 245 | 215 |
| 2 | 255 | 270 | 285 | 325 |
| 2C | 125 | 130 | 140 | 160 |

While there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A biaxially oriented heat sealable multilayer structure comprising:
   (a) a substrate layer comprising a polyolefin film;
   (b) a drawable, thermoplastic primer coating on at least one surface of the substrate layer, the primer having a glass transition temperature (Tg) from about 0° and 50° C.;

(c) a heat sealable acrylic or polyvinylidene chloride (PVDC) coating applied to at least one primer coated surface.

2. The structure of claim 1 wherein a coextruded layer of random copolymer of ethylene and propylene is present on at least one surface of the substrate before the primer coating is applied.

3. The structure of claim 1 wherein the substrate is fabricated from isotactic polypropylene.

4. The structure of claim 1 wherein said primer comprises a member selected from the group consisting of an acrylic polymer, a styrene-acrylic copolymer or a vinyl acrylic copolymer.

5. The structure of claim 1 wherein said primer is an interpolymer which comprises high Tg monomers, low Tg monomers and polar functional monomers.

6. The structure of claim 5 wherein the high Tg monomers are selected from the group consisting of styrene, methyl methacrylate, ethyl methacrylate and acrylonitrile.

7. The structure of claim 5 wherein the low Tg monomers are alkyl acrylate.

8. The structure of claim 7 wherein the alkyl acrylate is selected from the group consisting of methyl acrylate, ethyl acrylate and butyl acrylate.

9. The structure of claim 5 wherein the polar functional monomers contain carboxylic acid or hydroxyl functional groups.

10. The structure of claim 1 wherein the primer has a Tg of from about 10° to about 40° C.

11. The structure of claim 1 wherein the primer has a Tg of from about 15° to about 30° C.

12. The structure of claim 5 wherein the primer is in the form of an aqueous emulsion.

13. The structure of claim 1 wherein the structure is prepared by melt extruding the substrate and thereafter orienting the structure by stretching in the MD and then the TD direction, said primer coating being applied to said structure prior to stretching in the TD direction.

14. The structure of claim 1 wherein said substrate is subjected to a corona discharge treatment prior to the application of said primer coating.

15. The structure of claim 1 wherein said primer coating is present as a weight within the range of about 0.01 to about 1.0 grams per thousand square inches of surface on a dry weight basis.

* * * * *